June 18, 1946.  A. C. JOHNSON  2,402,229
TRANSMISSION
Filed Feb. 18, 1944
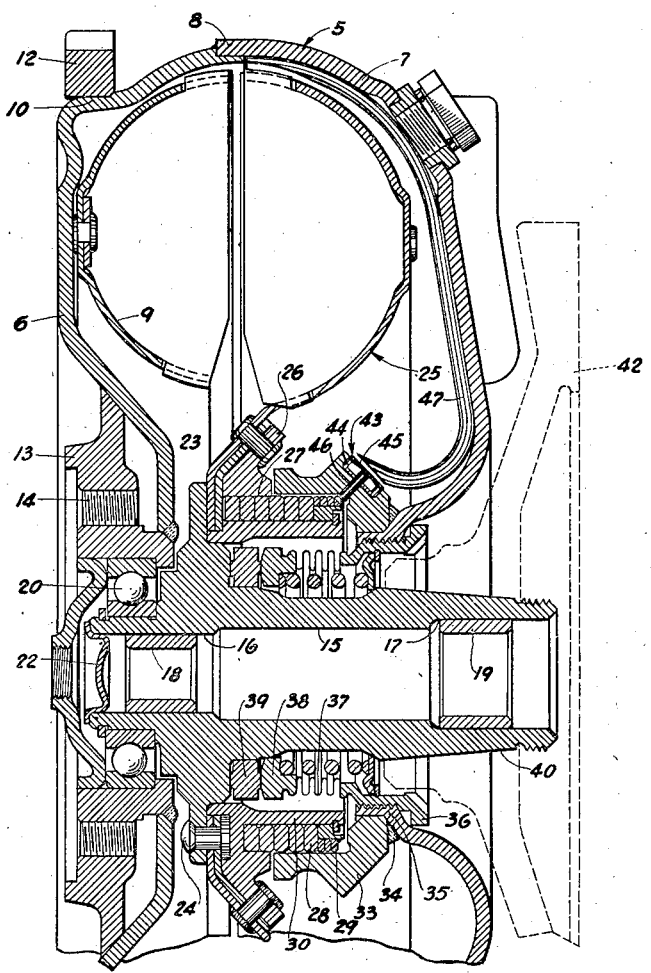
INVENTOR.
Arthur C Johnson
BY
Brown, Jackson, Boettcher & Dienner
ATTORNEYS.

Patented June 18, 1946

2,402,229

UNITED STATES PATENT OFFICE 2,402,229

TRANSMISSION

Arthur C. Johnson, Chicago, Ill., assignor to The Studebaker Corporation, South Bend, Ind., a corporation of Delaware Application February 18, 1944, Serial No. 522,863

6 Claims. (Cl. 192—3.2)

This invention relates to an improvement in transmissions and more particularly is directed to a fluid drive unit, such as a fluid coupling or torque converter, for use in vehicles or the like in which means is provided for locking up the fluid unit under certain conditions.

It has been found in connection with torque converters and fluid couplings that considerable difficulty is encountered in the operation of such apparatus due to the fact that the fluid used under some conditions of operation heats up to an extent that one or more members of the apparatus may burn out and render it inoperative. Also the fluid may be heated to such a degree that gases will be developed the pressure of which has in many instances caused the unit to explode. These circumstances especially occur in connection with fluid drive units of the closed type. Also high torque imposed through the apparatus causes heating of the fluid to an extent such that it looses its viscosity and consequently its torque transmitting ability.

The present invention may also be used with fluid couplings and torque converters incorporated in an open circuit which generally provide for continuous circulation of the fluid to maintain it at a predetermined temperature and pressure within the fluid unit.

An object of the present invention is to provide means for preventing overheating of the fluid in a fluid drive unit such as a fluid coupling or torque converter.

In order to accomplish the aforesaid object, I propose to provide in a fluid drive unit suitable thermally responsive clutch means for clutching the driving and driven members of the unit together for conjoint rotation when the temperature of the fluid reaches a predetermined degree, so that in effect the fluid unit becomes a fly wheel.

In the preferred form of my invention, I preferably provide a bimetallic member suitably carried within the fluid unit which bimetallic member is responsive to the temperature of the fluid within the unit for causing clutching and declutching of a suitable clutch means arranged between the driving and driven members of the unit. If desired the thermally responsive means may be of a character for causing clutching action of the clutch means at one temperature and declutching of the clutch means at another temperature.

The clutch of my invention may vary widely in form and in the embodiment herein disclosed comprising a coil spring clutch of known type which is adapted to be energized or caused to be de-energized by the bimetallic means.

Other objects and advantages of the present invention will more fully appear from the detail description.

Now in order to acquaint those skilled in the art with the manner of constructing and utilizing a device in accordance with my invention, I shall describe in connection with the accompanying drawing one embodiment of my invention.

In the drawing:

The single figure is a vertical view sectional through a fluid coupling embodying the present invention.

Referring now in detail to the drawing, I have disclosed a fluid coupling 5 comprising stampings 6 and 7, which are secured together by overlapping of the peripheral portions 8 to form an enclosed torus shaped housing. Secured to the stamping 6 internally of the housing is the impeller member 9, which may be of any desired form, and secured about a shoulder 10, on the stamping 6 is the ring gear 12, forming a starter gear for the engine of the vehicle in which the coupling is employed.

The coupling housing 5 is rigidly secured to a ring member 13 which is tapped as at 14 to receive suitable studs for securing the same to the flanged end of the engine crankshaft whereby the housing, including the impeller 9, is directly coupled to the engine crankshaft. Disposed within and extending axially of the housing 5 is the quill or sleeve shaft 15 which has formed therein the bearing seats 16 and 17 receiving the bearings 18 and 19 for rotatably mounting the drive gear and its associated shaft therein. The sleeve 15 at its forward end is journaled by means of the ball bearing assembly 20 in the hub portion of the ring member 13, whereby it is centered axially with respect to the crankshaft of the engine, and a suitable closure cap 22 closes the forward end of the sleeve 15 to prevent passage of the lubricant thereinto from the bearings 20.

The sleeve 15 is provided with the radially extending flange 23 upon which is mounted, by means of suitable rivets 24, the rotor or driven member of the coupling indicated generally at 25. The rotor member 25 has secured to it the annulus or ring member 26 which is arranged to provide an annular channel 27 therein adapted to receive the coiled spring member 28, one end of this spring member having locking engagement in the ring member 26. The ring member 26 has an axially extending hub portion 30 upon which the spring 28 is normally carried. Overlying this extended hub portion 30 in radially spaced relationship thereto to form a continuation of the channel 27 is the clutch sleeve member 33 welded as at 34 to the inner peripheral portion 35 of the housing 5. This inner peripheral portion 35 of the housing is internally threaded to receive the bushing 36 which carries at its inner end one end of the flexible bellows member 37, the opposite end of said bellows carrying the ring 38 bearing against the sealing ring 39, this being a more or less conventional oil sealing arrangement for preventing leakage of fluid from within the coupling outwardly along the external surface of the sleeve 15.

The sleeve 15 is provided with a tapered end portion 40 upon which is adapted to be mounted the clutch plate indicated by dotted lines at 42, forming one element of the friction clutch for the vehicle.

The free end of the coil spring 28 is provided with a teaser spring 29 of conventional construction. The sleeve 33 is formed with an enlarged rear end portion and is suitably recessed to receive a bimetallic actuating means 43. The thermally responsive means 43 comprises a cup member 44 fitting in the recess provided therefor in the enlarged rear end of member 33. A bimetallic element 45 is suitably secured adjacent the open end of the cup member 44, and a plunger member 46 is suitably secured at one end thereof centrally of the bimetallic element 45, which plunger member is adapted to extend through a bore in sleeve 33 with its other or free end in juxtaposition of the teaser spring 29. A fluid conducting tube 47 is carried internally of the stamping 7 of the fluid coupling housing 5. This tube is open at its opposite ends and is provided for conducting fluid within the coupling to the bimetallic element 45.

In the operation of the device above described, it will be apparent that when the engine of the vehicle is running the housing 5 will be rotated which, in turn, will rotate the impeller member 9 causing circulation of fluid within the coupling. As a result, the rotor 25 is urged into rotation which, in turn, transmits driving torque through the sleeve 15 and the clutch plate 42 to the drive gears of the vehicle. If the vehicle should become stalled because of the loss of traction of the drive wheels such as when operating in dry sand, mud or when driving on icy pavements the churning of the fluid of the coupling will cause the fluid to rise in temperature. If this temperature reaches an excessive degree the coupling will be destroyed by warpage of the fins or blades of the impeller or rotor, or both, or the excessive temperature may create gasses causing the unit to explode. The bimetallic element 45 is of such a character that upon the fluid reaching an excessive temperature it snaps inwardly of the position shown in the drawing thereby moving the plunger 46 inwardly causing the free end thereof to engage the teaser spring 29 and actuate the coil spring 28 to frictionally engage the internal clutch surface of the sleeve 33 whereby the spring 28 and sleeve 33 are frictionally clutched together. This, in turn, locks the rotor 25 for conjoint rotation with the sleeve 33 thereby eliminating the slippage since one end of spring 28 is secured to the member 26, in the coupling and producing a direct drive therethrough.

When the temperature within the coupling drops to a safe predetermined degree, the bimetallic element 45 returns to the position shown in the drawing so that the free end of plunger 46 is disengaged from the teaser spring 29 which releases the coil spring 28, from clutching engagement with the sleeve 33.

It will be observed that when the thermally responsive means 43 causes the aforementioned clutching action a direct drive is established. If desired the vehicle may be provided with a conventional friction clutch so that when the aforesaid clutching action occurs the vehicle may be operated in the conventional manner.

While I have shown what I consider to be a preferred embodiment of my invention, it will be understood that various modifications and rearrangements may be made therein without departing from the spirit and scope of my invention.

I claim:

1. In combination with a fluid torque transmitting unit comprising a driving member and a driven member, a clutch between said driving and driven members, means responsive to a predetermined temperature of the fluid within said unit for actuating said clutch, and means for conducting fluid within said unit to said thermally responsive means.

2. A fluid unit comprising a driving member and a driven member, said driving and driven members having coaxially extending hub portions, clutch means comprising a coil spring disposed within said hub portions with said coil spring being fixed to one of said members, and means associated with said clutch means responsive to a predetermined temperature of a fluid within said unit to engage and cause said coil spring to clutch said members together for conjoint rotation.

3. A fluid unit comprising a driving member and a driven member, said driving and driven members having coaxially extending hub portions, clutch means comprising a coil spring disposed within said hub portions with said coil spring being fixed to said driven member, and means associated with said clutch means responsive to a predetermined temperature of the fluid within said unit to engage and cause said coil spring to clutch said members together for conjoint rotation.

4. In a fluid coupling including a housing adapted to be driven from a source of power, an impeller element secured in said housing, a rotor element rotatably mounted in said housing and adapted to be driven by said impeller, clutch means between said elements adapted to clutch the same together for conjoint rotation, and thermally responsive means carried by said housing responsive to the temperature of the fluid within said coupling for actuating said clutch means.

5. A fluid unit comprising a driving member and a driven member, said driving and driven members having coaxially extending hub portions, clutch means comprising a coil spring disposed within said hub portions, said coil spring being fixed to one of said members, and thermally responsive means comprising a bimetallic element and a plunger member connected to said bimetallic element, said plunger member being positionable by said bimetallic element to engage the other end of said coil spring to cause the latter to be expanded radially and clutch said driving and driven members together for conjoint rotation.

6. In combination with a fluid torque transmitting unit comprising a driving member and a driven member having coaxially extending hub portions, clutch means comprising a coil spring disposed within said hub portions with said coil spring being fixed to one of said members, means carried by the hub portion of one of said members responsive to a predetermined temperature of the fluid of said unit to actuate said clutch means, and means for conducting fluid within said unit to said temperature responsive means.

ARTHUR C. JOHNSON.